US012641397B2

(12) United States Patent
Kuravangi-Thammaiah et al.

(10) Patent No.: US 12,641,397 B2
(45) Date of Patent: May 26, 2026

(54) SYSTEMS AND METHODS FOR OPTIMIZED PROPAGATION OF SHARED POLICY DATA

(71) Applicant: Verizon Patent and Licensing Inc., Basking Ridge, NJ (US)

(72) Inventors: Shanthala Kuravangi-Thammaiah, Keller, TX (US); Lixia Yan, Basking Ridge, NJ (US); Lalit R. Kotecha, San Ramon, CA (US); Robert Avanes, Roanoke, TX (US)

(73) Assignee: Verizon Patent and Li censing Inc., Basking Ridge, NJ (US)

( * ) Notice: Subject to any disclaimer, the term of this patent is extended or adjusted under 35 U.S.C. 154(b) by 645 days.

(21) Appl. No.: 18/154,511

(22) Filed: Jan. 13, 2023

(65) Prior Publication Data

US 2024/0244401 A1 Jul. 18, 2024

(51) Int. Cl.
*H04W 4/08* (2009.01)

(52) U.S. Cl.
CPC ..................................... *H04W 4/08* (2013.01)

(58) Field of Classification Search
CPC ......... H04W 4/02; H04W 12/06; H04W 8/02; H04W 12/08; H04W 4/20; H04W 84/042; H04W 36/08; H04W 12/35; H04W 4/24; H04W 4/50; H04W 8/20; H04W 88/06; H04W 48/16; H04W 8/18; H04W 28/0268
USPC ......................................... 455/517
See application file for complete search history.

(56) References Cited

U.S. PATENT DOCUMENTS

2021/0168584 A1* 6/2021 Li ......................... H04W 8/065
2023/0077026 A1* 3/2023 Bertz ..................... H04L 65/80

* cited by examiner

*Primary Examiner* — Ajibola A Akinyemi

(57) ABSTRACT

In some implementations, a network device may receive an indication of shared policy data that identifies UEs, included in a UE group. The shared policy data may be shared by the UEs, included in the UE group. The network device may generate an indication of an identifier of the shared policy data. The network device may associate the indication of the identifier with the UEs included in the UE group.

20 Claims, 9 Drawing Sheets

100

Resource URI Structure of the Nudr DataRepository Service API for Policy Data

{apiRoot}/nudr-dr/<apiVersion>

/policy-data

/ues

/ueId

/am-data — /Shared-am-DataId

/ue-policy-set — /Shared-ue-policy-set-DataId

/sm-data — /Shared-sm-DataId

125

Generate a shared policy data resource

UDR Device
105

500

510 Receive an indication of shared policy data that identifies user equipments (UEs), included in a UE group, that share the shared policy data 520 Generate an indication of an identifier of the shared policy data 530 Associate the indication of the identifier with the UEs included in the UE group 610 — Transmit a request for individual policy data associated with a UE that is included in a group of UEs 620 — Receive the individual policy data associated with the UE and an indication of an identifier associated with shared policy data that is shared by the UEs included in the group of UEs

600

SYSTEMS AND METHODS FOR OPTIMIZED PROPAGATION OF SHARED POLICY DATA

BACKGROUND

A unified data repository (UDR) device may support one or more network devices (e.g., a policy control function (PCF), a unified data management (UDM) device, and/or a network exposure function (NEF)). As an example, the one or more network devices may communicate (e.g., via an interface) with the UDR device to store and/or retrieve subscription data, policy data, structured data for exposure, and/or application data, among other examples. As another example, the one or more network devices may subscribe to receive data change notifications from the UDR device (e.g., based on the UDR device determining that data associated with a subscription is updated).

DETAILED DESCRIPTION OF EXAMPLE EMBODIMENTS

Figure 1A:
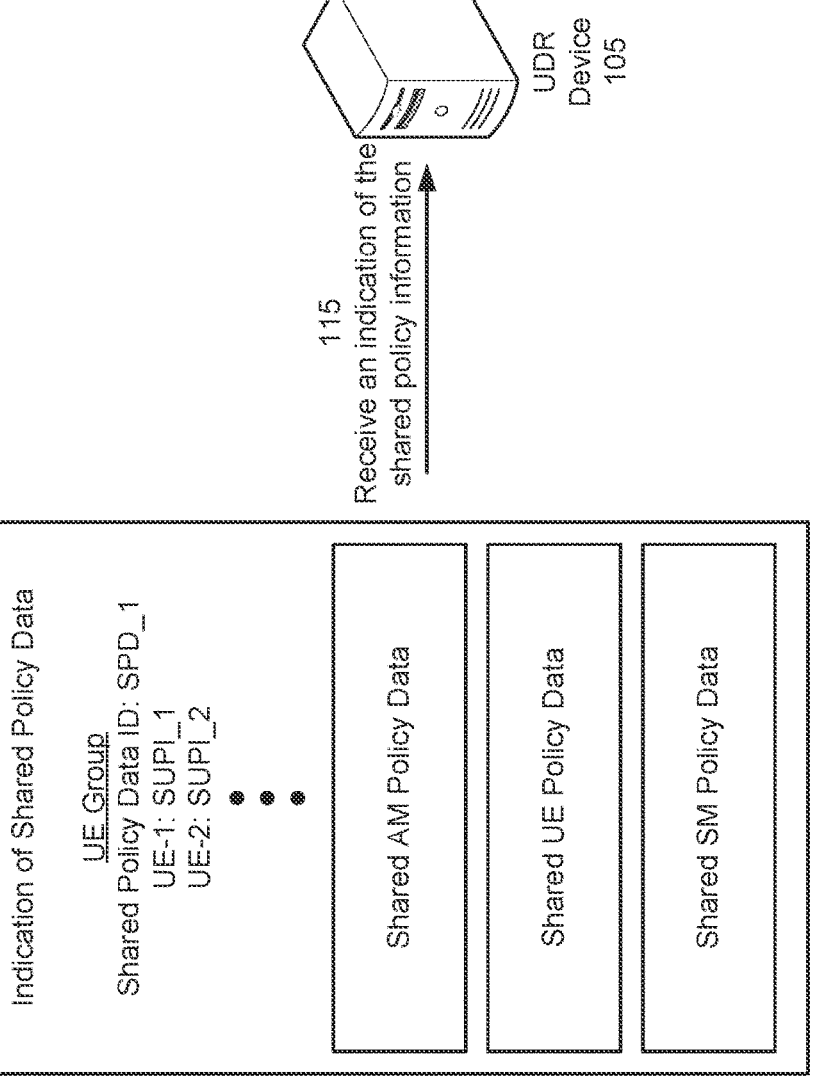
FIGS. 1A-1D are diagrams of an example associated with optimized propagation of shared policy data.

The following detailed description of example implementations refers to the accompanying drawings. The same reference numbers in different drawings may identify the same or similar elements.

A unified data repository (UDR) device may store data (e.g., subscription data, policy data, structured data for exposure, and/or application data) associated with user equipments (UEs), such as UEs associated with subscribers of a mobile network operator (MNO). As an example, the UDR device may provide a service (e.g., an Nudr data repository service) to a network device via an interface (e.g., an Nudr interface). For example, the Nudr interface may be an interface defined (e.g., by a wireless communication standard, such as the 3rd Generation Partnership Project (3GPP)) for one or more network functions or network devices, such as a UDM device, a policy control function (PCF), and/or an NEF, among other examples, to access a particular set of the data stored in the UDR device and to read, update (e.g., add and/or modify), delete, and/or subscribe to notifications of relevant data changes in the UDR device.

For example, the UDR device may provide a service application programming interface (API) (e.g., an Nudr data repository service API for policy data, an Nudr data repository service API for exposure data, and/or an Nudr data repository service API for application data) that enables the network device to perform operations (e.g., store, retrieve, create, update, notify, modify, and/or delete operations) associated with data stored in the UDR device. As an example, the network device may perform operations on policy data resources included in the Nudr data repository service API for policy data, which also referred herein as to as UDR policy data API.

As an example, the UDR policy data API may use uniform resource identifiers (URIs) to address resources (e.g., based on a resource URI structure associated with the UDR policy data API) and Hypertext Transfer Protocol (HTTP) methods to manipulate the resources. For example, the UDR policy data API may include an AM policy data resource, a UE policy set resource, and/or an SM policy data resource. The AM data resource may be a data representation of AM policy data associated with an individual UE, the UE policy set data resource may be a data representation of UE policy data associated with an individual UE, and/or the SM data resource may be a data representation of SM policy data associated with an individual UE.

As an example, the network device may use the UDR policy data API to perform operations (e.g., store and/or retrieve service operations) on the AM policy data, the UE policy data, and/or the SM policy data associated with individual UEs. For example, the network device may send a request (e.g., via an HTTP GET method) to retrieve the AM policy data (e.g., from an AM policy data resource), the UE policy data (e.g., from a UE policy data resource), and/or the SM policy data (e.g., from an SM policy data resource). The request may identify an individual UE (e.g., based on a subscription permanent identifier (SUPI) associated with the individual UE), a requested information type (e.g. AM policy data, UE policy data, and/or SM-policy data, and/or query parameters (e.g., supported features and/or a public land mobile network (PLMN) identifier (plmn-id).

As another example, a network device may use the UDR policy data API to subscribe to policy data notification changes associated with changes (e.g., modifications and/or updates) to policy data associated with individual UEs. For example, if policy data (e.g., AM policy data, UE policy data, and/or SM policy data) associated with an individual UE is updated, then the UDR device may send a data change notification (e.g., including the modified and/or updated policy data) to a network device based on a subscription (e.g., associated with the individual UE) between the network device and the UDR device.

In some cases, policy data associated with individual UEs may be shared by multiple UEs (e.g., AM policy data, UE policy data, and/or SM policy data may be shared by UEs included in a group of UEs). Although policy data may be shared by multiple UEs, the UDR device provides individual policy data change notifications when the policy data shared by the multiple UEs data is updated (e.g., based on subscriptions between the network device and the UDR device). Furthermore, even if the UDR device stores shared policy data (e.g., shared AM policy data, shared UE policy data, and/or shared SM policy data) associated with multiple UEs in a single resource URI structure, the UDR device still provides individual policy data change notifications when the shared policy data is updated. In other words, propagation of policy data changes may be performed by the UDR device on a per-UE basis (e.g., updating the policy data for each UE associated with the policy data).

Therefore, the UDR device may consume computing resources, network resources, processing resources, and/or memory resources, among other examples, associated with providing individual policy data change notifications for each UE. Additionally, network performance may be negatively impacted (e.g., network resources may be consumed and latency may be introduced to policy changes) because the UDR device may transmit a large number of policy data change notifications when propagating the policy data change notifications for multiple UEs. For example, if the UDR device provides a large number of policy data change notifications (e.g., based on a change to policy data that is shared by a large number of UEs, such as a large number of UEs in a UE group serviced by the MNO), then network transactions per second (TPS) may increase whenever the policy data is updated (e.g., by the MNO).

Some implementations herein provide optimized propagation of shared policy data. For example, a shared data solution at an interface between a network device and a UDR device (e.g., enabling shared data to be provided over an interface between the network device and the UDR device) may enable optimized propagation of shared policy data for UEs (e.g., a common group of UEs).

In some implementations, the UDR device may receive an indication of shared policy data that identifies UEs (e.g., UEs included in a UE group) which share the shared policy data. As an example, the UDR device may store the shared policy data in one or more data structures associated with the UDR device, such as a resource that is added to the UDR policy data API and/or a resource stored in an index of the UDR device. As an example, the UDR device may generate an indication of an identifier of the shared policy data and may associate the identifier with the UEs (e.g., the UEs included in the UE group).

In some implementations, the UDR device may provide shared policy data change notifications based on a subscription. For example, if the shared policy data (e.g., shared AM policy data, shared UE policy data, and/or shared SM policy data) for the UEs, included in the UE group, is changed (e.g., updated and/or modified), then the UDR device may transmit a shared policy data change notification (e.g., including the changed, modified and/or updated shared policy data) to a network device based on the subscription (e.g., to a network device that has subscribed for shared policy data change notifications for at least one UE included in the UE group).

In this way, the UDR device may propagate the shared policy data for multiple UEs via less communications (e.g., a single communication to a network device for the UEs included in the UE group) relative to propagating the shared policy data for the UEs via individual communications for each UE (e.g., individual communications to a network device for each UE included in the UE group). For example, if a network device is associated with one or more UEs, included in the UE group, then the UDR device may propagate the shared policy data for the one or more UEs, included in the UE group, to the network device via a single communication.

This improves network performance and conserves resources (e.g., computing resources, memory resources, and/or networking resources, among other examples) that would have otherwise been used propagating shared policy data for multiple UEs via individual communications for each UE of the multiple UEs. For example, this may optimize network flow, reduce network TPS, optimize shared policy data provisioning, optimize shared policy data change propagation, and/or remove the need to provide individual communications to propagate shared policy data, among other examples.

Thus, it would be desirable for the UDR device to provide a policy data change notification to a network device for multiple UEs (e.g., a single policy data change notification for modifying and/or updating the policy data for multiple UEs) whenever shared policy data (e.g., associated with a large number of UEs) is updated rather than providing individual policy data change notifications, for each UE, whenever shared data is updated.

FIGS. 1A-1D are diagrams of an example 100 associated with optimized propagation of shared policy data. As shown in FIGS. 1A-1D, example 100 includes a UDR device. This device is depicted and described in more detail in connection with FIGS. 3 and 4.

As shown in FIG. 1A, and by reference number 115, the UDR device 105 may receive an indication of shared policy data. In some implementations, the indication of shared policy data may be transmitted to the UDR device 105 from an MNO device (not shown) associated with an MNO. As an example, the MNO device may maintain (e.g., in a data structure) UE group information associated with UEs (e.g., associated with subscribers of the MNO). For example, the UE group information may include information that identifies UEs, included in a UE group, which share policy data.

In some implementations, the shared policy data may be classified into a first shared policy data type (e.g., shared AM policy data), a second shared policy data type (e.g., shared UE policy data), and/or a third shared policy data type (e.g., shared SM policy data). Thus, in some implementations, the MNO device may generate the indication of shared policy data to enable the shared policy data (e.g., indicated by the shared policy data type) to be propagated for the UEs, included in the UE group, as described in more detail elsewhere herein. Although some examples are described herein using shared AM policy data, shared UE policy data, and shared SM policy data as examples of shared data, any type of data stored by the UDR device 105 that is shared by multiple UEs may be propagated in a similar manner as described herein.

In some implementations, the indication of shared policy data (e.g., generated by the MNO device) may identify UEs, included in the UE group, which share the shared policy data. For example, the indication of shared policy data may identify the UE group via a UE group identifier and/or may identify the UEs via UE identifiers (e.g., SUPIs and/or generic public subscription identifiers (GPSI) associated with the UEs, among other examples). As shown in FIG. 1A, the indication of shared policy data identifies a UE group (e.g., identified by UE group identifier of SPD_1), a first UE (e.g., UE-1, which is identified by a UE identifier of SUPI_1) and a second UE (e.g., UE-2, which is identified by a UE identifier of SUPI_2) included in the UE group, among other examples.

As further shown in FIG. 1A, the indication of shared policy data may include shared AM policy data, shared UE policy data, and shared SM policy data. Thus, for example, the first UE (e.g., UE-1) and the second UE (e.g., UE-2) share AM policy data, UE policy data, and SM policy data. For example, the first UE (e.g., UE-1) and the second UE (e.g., UE-2) may be associated with subscribers that have access to the same services provided by an MNO (e.g., based on a subscription associated with the MNO). Additionally, or alternatively, the indication of shared policy data may include information that enables the shared policy data to be retrieved by the UDR device 105. For example, the indication of shared policy data may include a pointer to a data structure that stores the shared policy data, and the UDR device may use the pointer to obtain the shared policy data from the data structure.

Figure 1B:
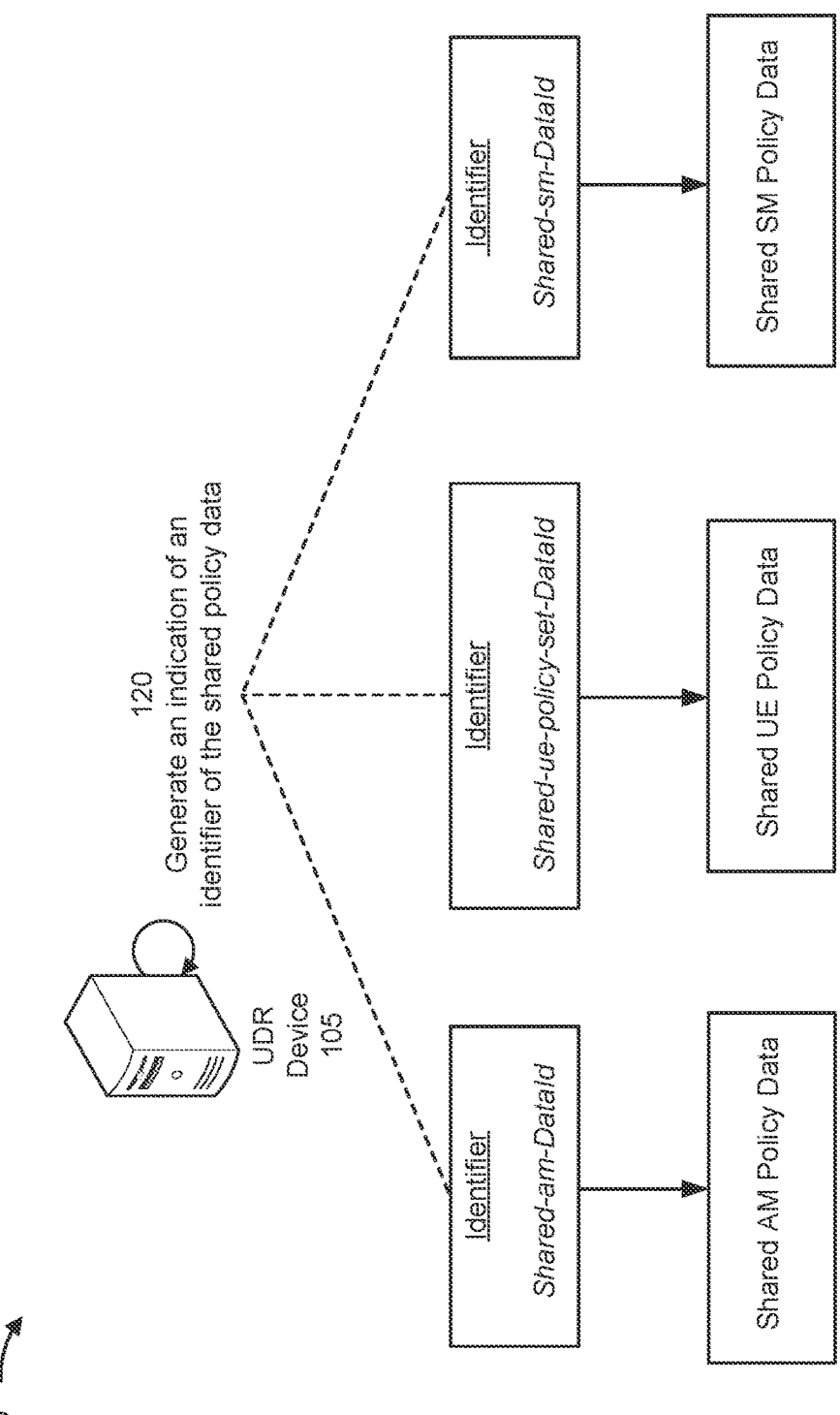

As shown in FIG. 1B, and by reference number 120, the UDR device 105 may generate an indication of an identifier of the shared policy data. In some implementations, the indication of an identifier of the shared policy data may be based on information provided by the MNO (e.g., included in the indication of shared policy data). As an example, the indication of an identifier of the shared policy data may include an identifier that points to the shared policy data included in the indication of shared policy data. In this way, the UDR device 105 may use the identifier to retrieve the shared policy data and propagate the shared policy data for the UEs included in the UE group, as described in more detail elsewhere herein.

For example, as shown in FIG. 1B, the indication of an identifier of the shared policy data (e.g., generated by the UDR device 105) includes a first identifier (e.g., shown as Shared-am-DataId) that points to a first shared policy data type (e.g., shown as Shared AM Policy Data), a second identifier (e.g., shown as Shared-ue-policy-set-DataId) that points to a second shared policy data type (e.g., shown as Shared UE Policy Data), and a third identifier (e.g., shown as Shared-sm-DataId) that points to a third shared policy data type (e.g., shown as Shared SM Policy Data). As an example, the identifier of the shared policy data may be included in a resource URI associated with a shared policy data resource of a resource URI structure, as described in more detail elsewhere herein. In this way, the UDR device 105 may propagate the shared policy data in response to receiving a request to retrieve the shared policy data that identifies the requested information using the resource URI associated with the shared policy data, as described in more detail elsewhere herein.

As another example, the indication of an identifier of the shared policy data (e.g., generated by the UDR device 105) may include an identifier that points to the shared policy data and that associates each UE, included in the UE group, with the shared policy data. For example, the identifier may be an index pointer that points to the shared policy data (e.g., stored in a data structure associated with the UDR device 105) and that is associated with each UE included in the UE group. In this way, the UDR device 105 may propagate the shared policy data for each UE that is associated with the identifier, as described in more detail elsewhere herein. For example, if a network device is associated with the UEs, included in the UE group, then the UDR device 105 may propagate the shared policy data to the network device for each UE that is associated with the identifier via a single communication (e.g., to initially provision or update the UEs with the shared policy data).

Figure 1C:
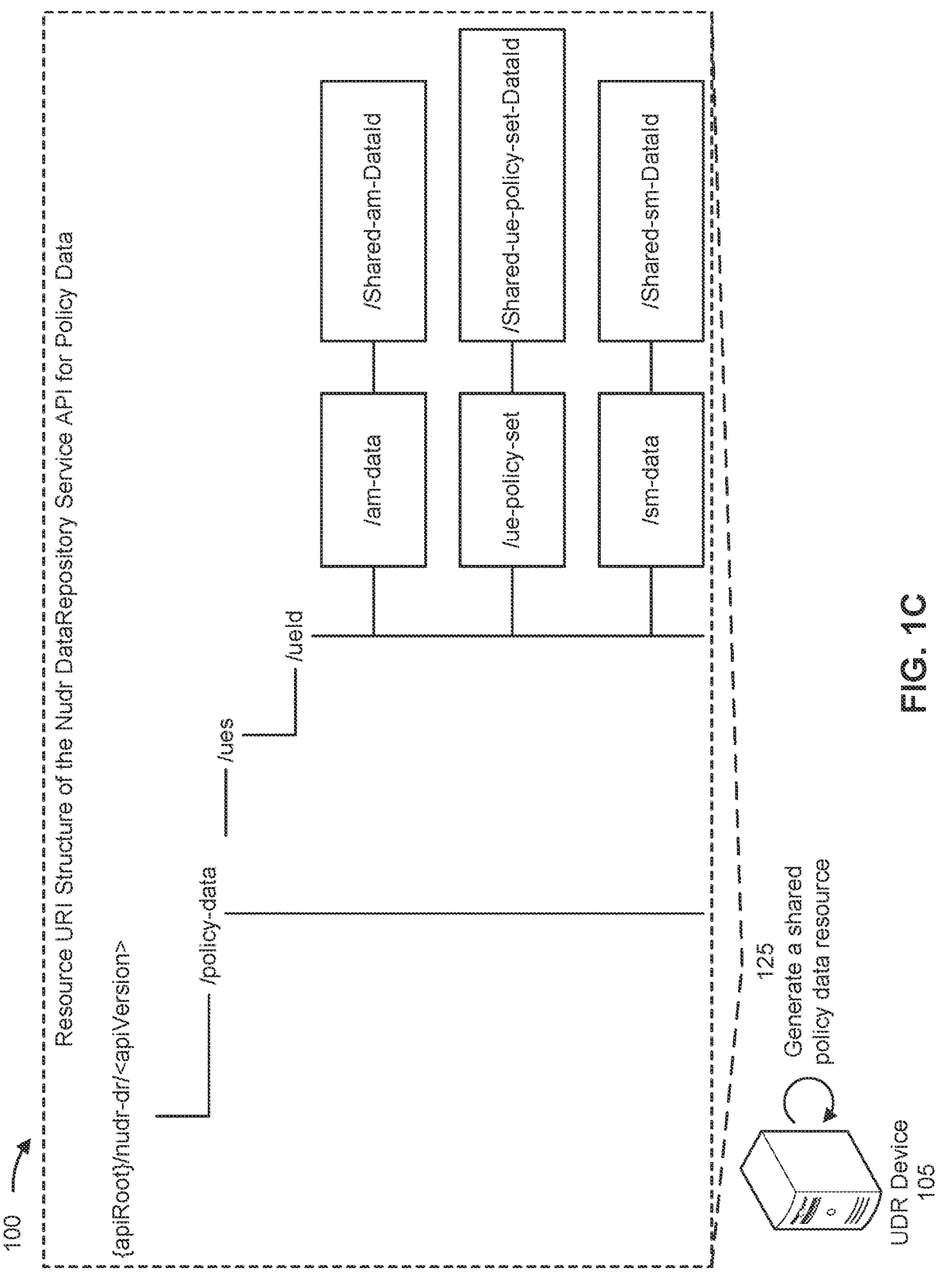

As shown in FIG. 1C, and by reference number 125, the UDR device 105 may generate a shared policy data resource. In some implementations, the UDR device 105 may generate the shared policy data resource based on the shared policy data included in the indication of shared policy data. For example, the shared policy data resource (e.g., generated by the UDR device 105) may be based on a shared policy data type of the shared policy data included in the indication of shared policy data. For example, the UDR device 105 may generate a first shared policy data resource (e.g., a data representation of the shared AM policy data), a second shared policy data resource (e.g., a data representation of the shared UE policy data), and a third shared policy data resource (e.g., a data representation of the shared SM policy data) based on the indication of shared policy data shown and described in connection with FIG. 1A and/or as described elsewhere herein.

In some implementations, the first shared policy data resource, the second shared policy data resource, and/or the third shared policy data resource may be included in the resource URI structure of the UDR policy data API. As an example, the first shared policy data resource may be associated with a first resource URI (e.g., shown as {api- Root}/nudr-dr/{apiVersion}/policy-data/ues/{ueId}/Shared-am-DataId in FIG. 1C). The second shared policy data resource may be associated with a second resource URI (e.g., shown as {apiRoot}/nudr-dr/{apiVersion}/policy-data/ues/{ueId}/Shared-ue-policy-set-DataId in FIG. 1C). As another example, the third shared policy data resource may be associated with a third resource URI (e.g., shown as {apiRoot}/nudr-dr/{apiVersion}/policy-data/ues/{ueId}/Shared-sm-DataId in FIG. 1C). Thus, in some implementations, the UDR device 105 may provide the shared policy data (e.g., the shared AM policy data, the shared UE policy data, and/or the shared SM policy data) for UEs in response to requests to retrieve the shared policy data for UEs. For example, the UDR device 105 may provide the shared AM policy data for a UE in response to receiving a GET request (e.g., from a network device) that identifies the UE (e.g., using the SUPI associated with the UE) and that identifies the requested information type by using the resource URI associated with the shared AM policy data (e.g., {apiRoot}/nudr-dr/{apiVersion}/policy-data/ues/{ueId}/Shared-am-DataId).

Figure 1D:
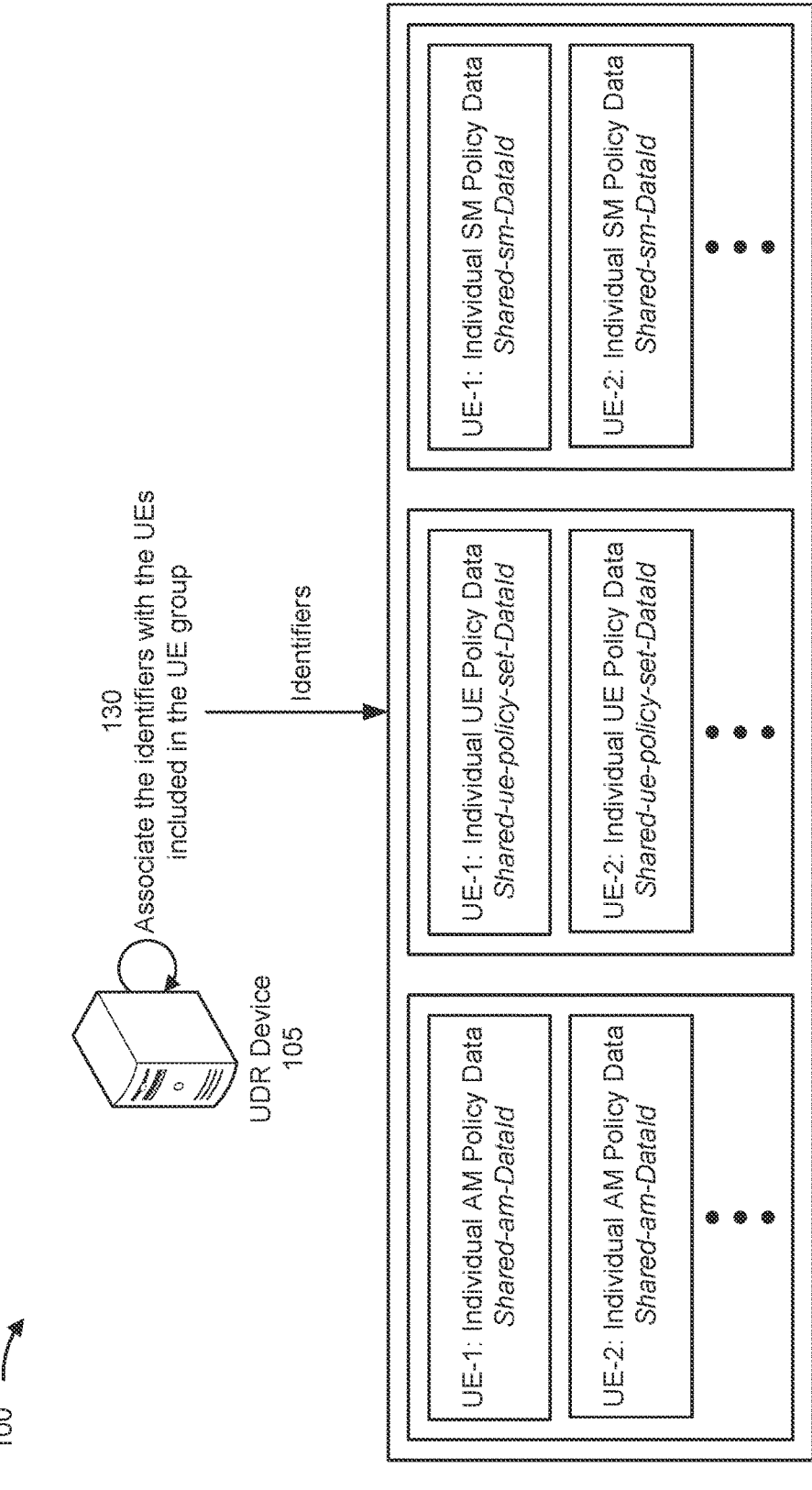

As shown in FIG. 1D, and by reference number 130, the UDR device 105 may associate the identifiers with the UEs included in the UE group. In some implementations, the UDR device 105 may associate the identifiers with the UEs, included in the UE group, by adding the identifiers to individual policy data associated with the UEs, included in the UE group. In this way, if the UDR device 105 provides the individual policy data for the UEs, included in the UE group, then the UDR device 105 provides the identifier for the UEs, included in the UE group (e.g., because the identifier is included in the individual policy data).

As shown in FIG. 1D, the first UE (e.g., UE-1) and the second UE (e.g., UE-2) include individual AM policy data, individual UE policy data, and/or individual SM policy data. As further shown in FIG. 1D, the individual AM policy data associated with the first UE and the second UE include the first identifier (e.g., Shared-am-DataId), the individual UE policy data associated with the first UE and the second UE include the second identifier (e.g., Shared-ue-policy-set-DataId), and the individual SM policy data associated with the first UE and the second UE include the third identifier (e.g., Shared-am-DataId). In this way, the UDR device 105 may associate shared policy data with multiple UEs (e.g., UEs included in the UE group).

As an example, a network device may transmit, and the UDR device 105 may receive, a first request (e.g., a request to retrieve the individual AM policy data, the individual UE policy data, and the individual SM policy associated with the first UE (e.g., UE-1)), and a second request (e.g., a request to retrieve the individual AM policy data, the individual UE policy data, and the individual SM policy associated with the second UE (e.g., UE-2)). Based on the first request, the UDR device 105 may transmit, and the network device may receive, a first response (e.g., including the individual AM policy, the individual UE policy data, and the individual SM policy associated with the first UE).

Based on the second request, the UDR device 105 may transmit, and the network device may receive, a second response (e.g., including the individual AM policy data, the individual UE policy data, and the individual SM policy associated with the second UE). The individual AM policy data in the first response and the second response may include the first identifier (e.g., Shared-am-DataId). The individual UE policy data in the first response and the second response may include the second identifier (e.g., Shared-UE-policy-set-DataId). The individual SM policy data in the first response and the second response may include the third identifier (e.g., Shared-sm-DataId).

In some implementations, a network device may use the identifiers to retrieve the shared policy data (e.g., for individual UEs using a GET request, as described in more detail elsewhere herein). For example, a network device (e.g., an AMF) may use the first identifier to retrieve the shared AM policy data (e.g., using a GET request that identifies an individual UE). As an example, a network device (e.g., a PCF) may use the second identifier to retrieve the shared UE policy data (e.g., using a GET request that identifies an individual UE). As another example, a network device (e.g., an SMF) may use the third identifier to retrieve the shared SM policy data (e.g., using a GET request that identifies an individual UE). Additionally, or alternatively, the UDR device 105 may transmit the shared policy data with the individual policy data for the UE based on the request for the individual policy data for the UE (e.g., without receiving a request for the shared policy data from a network device).

In this way, the UDR device may propagate the shared policy data for multiple UEs via less communications (e.g., a single communication to a network device for the UEs included in the UE group) relative to propagating the shared policy data for the UEs via individual communications for each UE (e.g., individual communications to a network device for each UE included in the UE group). For example, if a network device is associated with one or more UEs, included in the UE group, then the UDR device may propagate the shared policy data for the one or more UEs, included in the UE group, to the network device via a single communication.

This improves network performance and conserves resources (e.g., computing resources, memory resources, and/or networking resources, among other examples) that would have otherwise been used propagating shared policy data for multiple UEs via individual communications for each UE of the multiple UEs. For example, this may optimize network flow, reduce network TPS, optimize shared policy data provisioning, optimize shared policy data change propagation, and/or remove the need to provide individual communications to propagate shared policy data, among other examples.

As indicated above, FIGS. 1A-1D are provided as an example. Other examples may differ from what is described with regard to FIGS. 1A-1D. The number and arrangement of devices shown in FIGS. 1A-1D are provided as an example. In practice, there may be additional devices, fewer devices, different devices, or differently arranged devices than those shown in FIGS. 1A-1D. Furthermore, two or more devices shown in FIGS. 1A-1D may be implemented within a single device, or a single device shown in FIGS. 1A-1D may be implemented as multiple, distributed devices. Additionally, or alternatively, a set of devices (e.g., one or more devices) shown in FIGS. 1A-1D may perform one or more functions described as being performed by another set of devices shown in FIGS. 1A-1D.

Figure 2:
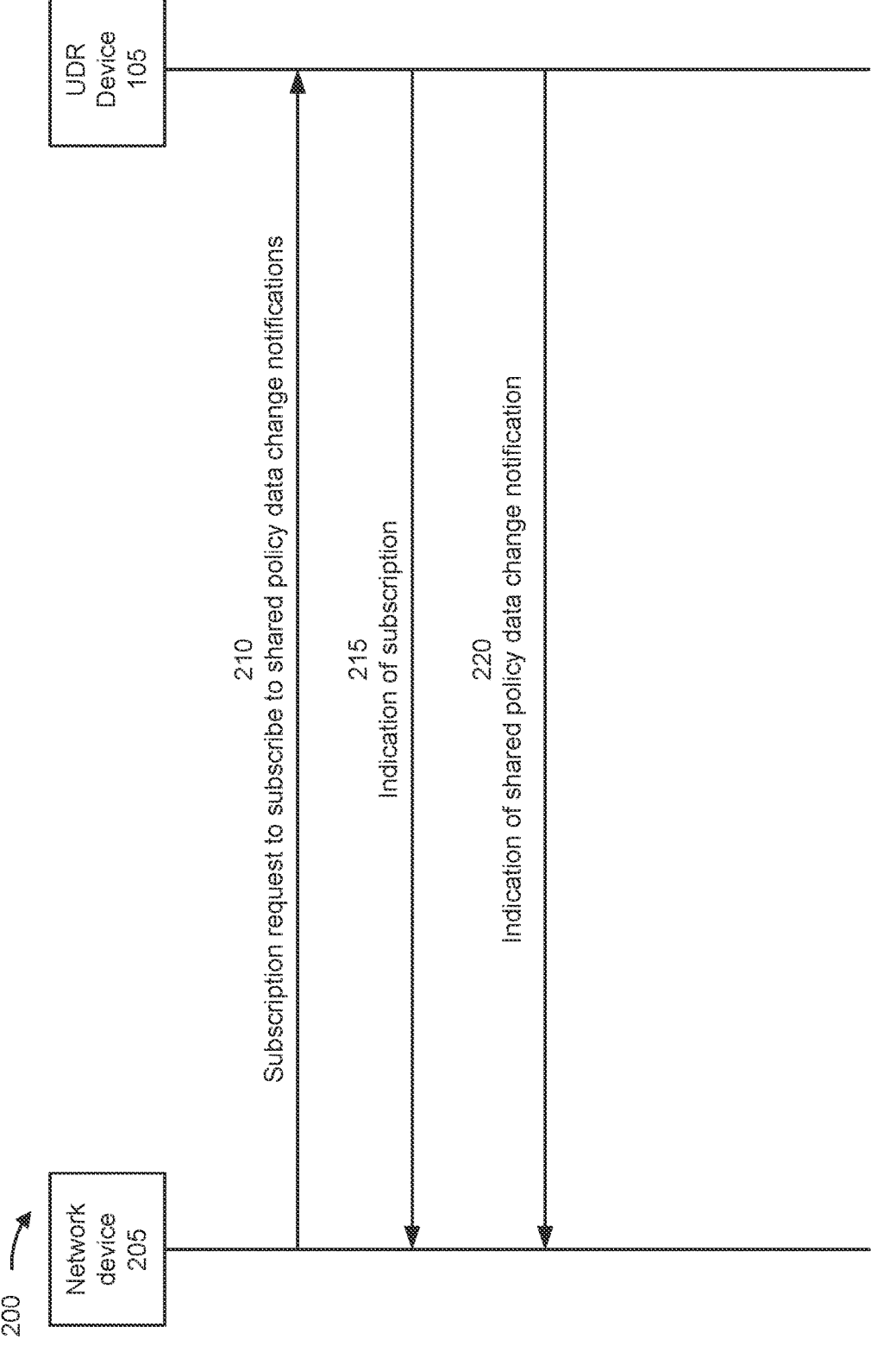
FIG. 2 is a diagram of an example associated with optimized propagation of shared policy data.

FIG. 2 is a diagram of an example 200 associated with optimized propagation of shared policy data. As shown in FIG. 2, example 200 includes the UDR device 105 and a network device 205. These devices are depicted and described in more detail in connection with FIGS. 3 and 4.

As shown in FIG. 2, and by reference number 210, the network device 205 may transmit, and the UDR device 105 may receive, a subscription request to subscribe to shared policy data change notifications (e.g., from the UDR device 105). In some implementations, the UDR device 105 may provide a subscription service associated with transmitting shared policy data change notifications for data changes (e.g., modifications and/or updates) to the shared policy data for the for the UEs included in the UE group. For example, if the shared policy data for the UEs, included in the UE group, is changed, then the UDR device 105 may transmit a shared policy data change notification (e.g., including the changed shared policy data) to a subscriber (e.g., a network device 205 associated with one or more UEs included in the UE group) of the subscription.

In some implementations, the network device 205 may transmit the subscription request based on determining that one or more UEs (e.g., associated with the network device 205) is associated with shared policy data. For example, the network device 205 may determine that one or more UEs is associated with shared policy data based on receiving the shared policy data. For example, the network device 205 may receive the shared policy data for initially provisioning the one or more UEs (e.g., from an MNO). As another example, the network device 205 may receive the shared policy data based on a request to retrieve the shared policy data for a UE that is included in the UE group (e.g., after receiving the identifier of the shared policy data with the individual policy data for the UE, included in the UE group, as described in more detail in connection with FIG. 1D and/or as described elsewhere herein). As yet another example, the network device 205 may receive the shared policy data based on a request for individual policy data for a UE, included in the UE group (e.g., without transmitting a request for the shared policy data to the UDR device 105).

As shown by reference number 215, the UDR device 105 may transmit, and the network device 205 may receive, an indication of subscription (e.g., to the shared policy data change notification subscription). For example, the UDR device 105 may transmit, based on the subscription request, the indication of subscription to confirm that the network device 205 is subscribed to the subscription.

As shown by reference number 220, the UDR device 105 may provide an indication of shared policy data change notification (e.g., based on the subscription). For example, if the shared policy data (e.g., shared AM policy data, shared UE, policy data, and/or shared SM policy data) for the UEs, included in the UE group, is changed (e.g., modified and/or updated), then the UDR device 105 may transmit a shared policy data change notification (e.g., including the changed, modified and/or updated shared policy data) to the network device 205 based on the subscription.

In this way, the UDR device may propagate the shared policy data for multiple UEs via less communications (e.g., a single communication to a network device for the UEs included in the UE group) relative to propagating the shared policy data for the UEs via individual communications for each UE (e.g., individual communications to a network device for each UE included in the UE group). For example, if a network device is associated with one or more UEs, included in the UE group, then the UDR device may propagate the shared policy data for the one or more UEs, included in the UE group, to the network device via a single communication.

This improves network performance and conserves resources (e.g., computing resources, memory resources, and/or networking resources, among other examples) that would have otherwise been used propagating shared policy data for multiple UEs via individual communications for each UE of the multiple UEs. For example, this may optimize network flow, reduce network TPS, optimize shared policy data provisioning, optimize shared policy data change propagation, and/or remove the need to provide individual communications to propagate shared policy data, among other examples.

As indicated above, FIG. 2 is provided as an example. Other examples may differ from what is described with regard to FIG. 2. The number and arrangement of devices shown in FIG. 2 are provided as an example. In practice, there may be additional devices, fewer devices, different devices, or differently arranged devices than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) shown in FIG. 2 may perform one or more functions described as being performed by another set of devices shown in FIG. 2.

Figure 3:
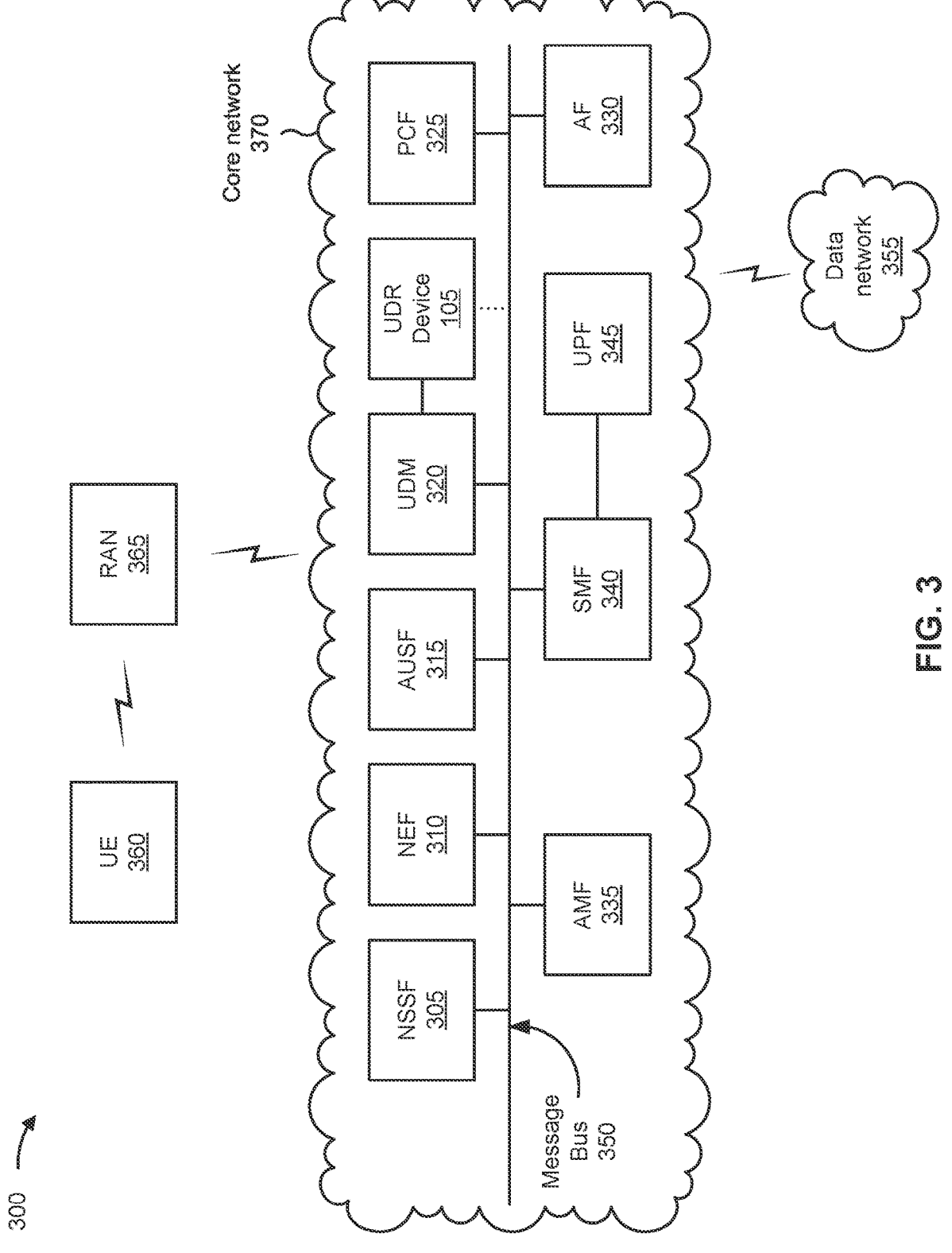
FIG. 3 is a diagram of an example environment in which systems and/or methods described herein may be implemented.

FIG. 3 is a diagram of an example environment 300 in which systems and/or methods described herein may be implemented. As shown in FIG. 3, example environment 300 may include a UDR device 105, a data network 355, UE 360, a RAN 365, and a core network 370. Devices and/or networks of example environment 300 may interconnect via wired connections, wireless connections, or a combination of wired and wireless connections.

UDR device 105 includes one or more devices that store subscription data, policy data, structured data for exposure, and/or application data and/or profiles in the wireless telecommunications system. UDR device 105 may be used for fixed access and/or mobile access in core network 370.

UE 360 includes one or more devices capable of receiving, generating, storing, processing, and/or providing information, such as information described herein. For example, UE 360 can include a mobile phone (e.g., a smart phone or a radiotelephone), a laptop computer, a tablet computer, a desktop computer, a handheld computer, a gaming device, a wearable communication device (e.g., a smart watch or a pair of smart glasses), a mobile hotspot device, a fixed wireless access device, customer premises equipment, an autonomous vehicle, or a similar type of device.

RAN 365 may support, for example, a cellular radio access technology (RAT). RAN 365 may include one or more base stations (e.g., base transceiver stations, radio base stations, node Bs, eNodeBs (eNBs), gNodeBs (gNBs), base station subsystems, cellular sites, cellular towers, access points, transmit receive points (TRPs), radio access nodes, macrocell base stations, microcell base stations, picocell base stations, femtocell base stations, or similar types of devices) and other network entities that can support wireless communication for UE 360. RAN 365 may transfer traffic between UE 360 (e.g., using a cellular RAT), one or more base stations (e.g., using a wireless interface or a backhaul interface, such as a wired backhaul interface), and/or core network 370. RAN 365 may provide one or more cells that cover geographic areas.

In some implementations, RAN 365 may perform scheduling and/or resource management for UE 360 covered by RAN 365 (e.g., UE 360 covered by a cell provided by RAN 365). In some implementations, RAN 365 may be controlled or coordinated by a network controller, which may perform load balancing, network-level configuration, and/or other operations. The network controller may communicate with RAN 365 via a wireless or wireline backhaul. In some implementations, RAN 365 may include a network controller, a self-organizing network (SON) module or component, or a similar module or component. In other words, RAN 365 may perform network control, scheduling, and/or network management functions (e.g., for uplink, downlink, and/or sidelink communications of UE 360 covered by RAN 365).

In some implementations, core network 370 may include an example functional architecture in which systems and/or methods described herein may be implemented. For example, core network 370 may include an example architecture of a fifth generation (5G) next generation (NG) core network included in a 5G wireless telecommunications system. While the example architecture of core network 370 shown in FIG. 2 may be an example of a service-based architecture, in some implementations, core network 370 may be implemented as a reference-point architecture and/or a 4G core network, among other examples.

As shown in FIG. 3, core network 370 may include a number of functional elements. The functional elements may include, for example, a network slice selection function (NSSF) 305, a network exposure function (NEF) 310, an authentication server function (AUSF) 315, a unified data management (UDM) component 320 (also referred to as UDM device 320), a policy control function (PCF) 325, an application function (AF) 330, an access and mobility management function (AMF) 335, a session management function (SMF) 340, and/or a user plane function (UPF) 345. The network device 205 described elsewhere herein may include one or more of the functional elements of the core network 370. For example, the network device 205 may include the NSSF 305, the NEF 310, the AUSF 315, the UDM component 320, the PCF 325, the AF 330, the AMF 335, the SMF 340, and/or the UPF 345, among other examples. These functional elements may be communicatively connected via a message bus 350. Each of the functional elements shown in FIG. 3 is implemented on one or more devices associated with a wireless telecommunications system. In some implementations, one or more of the functional elements may be implemented on physical devices, such as an access point, a base station, and/or a gateway. In some implementations, one or more of the functional elements may be implemented on a computing device of a cloud computing environment.

NSSF 305 includes one or more devices that select network slice instances for UE 360. By providing network slicing, NSSF 305 allows an operator to deploy multiple substantially independent end-to-end networks potentially with the same infrastructure. In some implementations, each slice may be customized for different services.

NEF 310 includes one or more devices that support exposure of capabilities and/or events in the wireless telecommunications system to help other entities in the wireless telecommunications system discover network services.

AUSF 315 includes one or more devices that act as an authentication server and support the process of authenticating UE 360 in the wireless telecommunications system.

UDM 320 includes one or more devices that store user data and profiles in the wireless telecommunications system. UDM 320 may be used for fixed access and/or mobile access in core network 370.

PCF 325 includes one or more devices that provide a policy framework that incorporates network slicing, roaming, packet processing, and/or mobility management, among other examples.

AF 330 includes one or more devices that support application influence on traffic routing, access to NEF 310, and/or policy control, among other examples.

AMF 335 includes one or more devices that act as a termination point for non-access stratum (NAS) signaling and/or mobility management, among other examples.

SMF 340 includes one or more devices that support the establishment, modification, and release of communication sessions in the wireless telecommunications system. For example, SMF 340 may configure traffic steering policies at UPF 345 and/or may enforce user equipment IP address allocation and policies, among other examples.

UPF 345 includes one or more devices that serve as an anchor point for intra-RAT and/or inter-RAT mobility. UPF 345 may apply rules to packets, such as rules pertaining to packet routing, traffic reporting, and/or handling user plane QoS, among other examples.

Message bus 350 represents a communication structure for communication among the functional elements. In other words, message bus 350 may permit communication between two or more functional elements.

Data network 355 includes one or more wired and/or wireless data networks. For example, data network 355 may include an IP Multimedia Subsystem (IMS), a public land mobile network (PLMN), a local area network (LAN), a wide area network (WAN), a metropolitan area network (MAN), a private network such as a corporate intranet, an ad hoc network, the Internet, a fiber optic-based network, a cloud computing network, a third party services network, an operator services network, and/or a combination of these or other types of networks.

The number and arrangement of devices and networks shown in FIG. 3 are provided as an example. In practice, there may be additional devices and/or networks, fewer devices and/or networks, different devices and/or networks, or differently arranged devices and/or networks than those shown in FIG. 3. Furthermore, two or more devices shown in FIG. 3 may be implemented within a single device, or a single device shown in FIG. 3 may be implemented as multiple, distributed devices. Additionally, or alternatively, a set of devices (e.g., one or more devices) of example environment 300 may perform one or more functions described as being performed by another set of devices of example environment 300.

Figure 4:
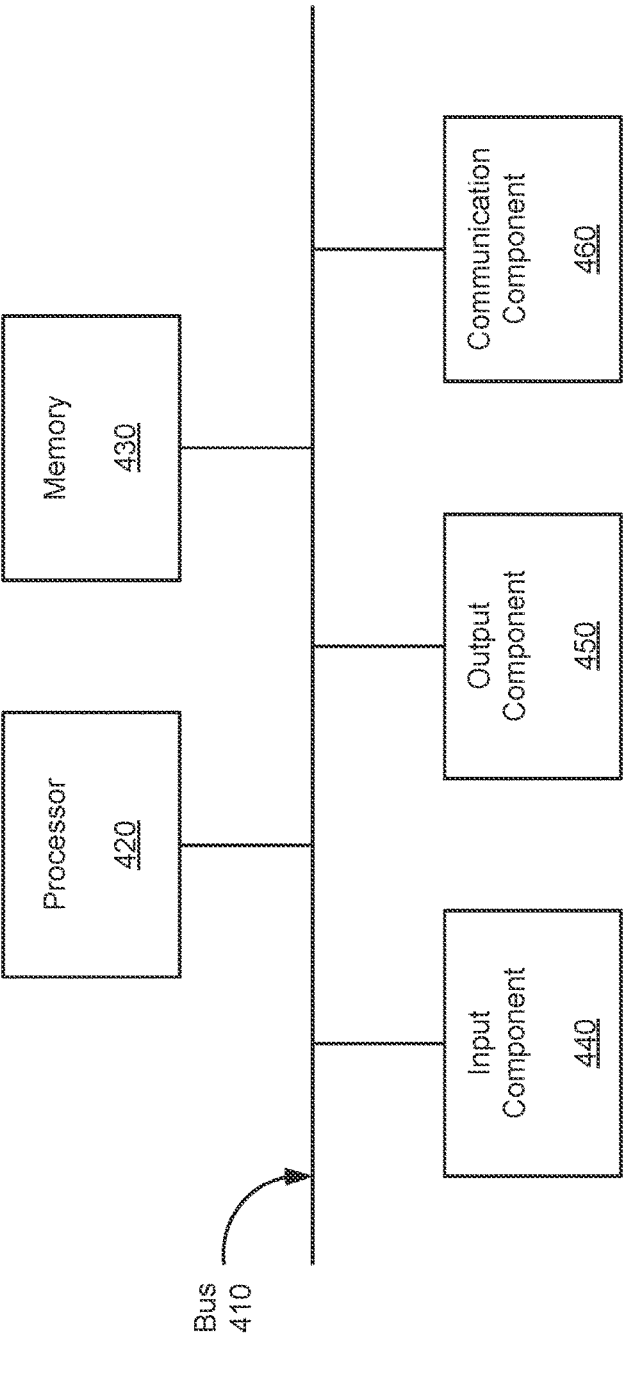
FIG. 4 is a diagram of example components of a device associated with optimized propagation of shared data policy.

FIG. 4 is a diagram of example components of a device 400 associated with optimized propagation of shared data policy. The device 400 may correspond to UDR device 105 and/or network device 205 (e.g., the NSSF 305, the NEF 310, the AUSF 315, the UDM component 320, the PCF 325, the AF 330, the AMF 335, the SMF 340, and/or the UPF 345). In some implementations, UDR device 105 and/or network device 205 may include one or more devices 400 and/or one or more components of the device 400. As shown in FIG. 4, the device 400 may include a bus 410, a processor 420, a memory 430, an input component 440, an output component 450, and/or a communication component 460.

The bus 410 may include one or more components that enable wired and/or wireless communication among the components of the device 400. The bus 410 may couple together two or more components of FIG. 4, such as via operative coupling, communicative coupling, electronic coupling, and/or electric coupling. For example, the bus 410 may include an electrical connection (e.g., a wire, a trace, and/or a lead) and/or a wireless bus. The processor 420 may include a central processing unit, a graphics processing unit, a microprocessor, a controller, a microcontroller, a digital signal processor, a field-programmable gate array, an application-specific integrated circuit, and/or another type of processing component. The processor 420 may be implemented in hardware, firmware, or a combination of hardware and software. In some implementations, the processor 420 may include one or more processors capable of being programmed to perform one or more operations or processes described elsewhere herein.

The memory 430 may include volatile and/or nonvolatile memory. For example, the memory 430 may include random access memory (RAM), read only memory (ROM), a hard disk drive, and/or another type of memory (e.g., a flash memory, a magnetic memory, and/or an optical memory). The memory 430 may include internal memory (e.g., RAM, ROM, or a hard disk drive) and/or removable memory (e.g., removable via a universal serial bus connection). The memory 430 may be a non-transitory computer-readable medium. The memory 430 may store information, one or more instructions, and/or software (e.g., one or more software applications) related to the operation of the device 400. In some implementations, the memory 430 may include one or more memories that are coupled (e.g., communicatively coupled) to one or more processors (e.g., processor 420), such as via the bus 410. Communicative coupling between a processor 420 and a memory 430 may enable the processor 420 to read and/or process information stored in the memory 430 and/or to store information in the memory 430.

The input component 440 may enable the device 400 to receive input, such as user input and/or sensed input. For example, the input component 440 may include a touch screen, a keyboard, a keypad, a mouse, a button, a microphone, a switch, a sensor, a global positioning system sensor, an accelerometer, a gyroscope, and/or an actuator. The output component 450 may enable the device 400 to provide output, such as via a display, a speaker, and/or a light-emitting diode. The communication component 460 may enable the device 400 to communicate with other devices via a wired connection and/or a wireless connection. For example, the communication component 460 may include a receiver, a transmitter, a transceiver, a modem, a network interface card, and/or an antenna.

The device 400 may perform one or more operations or processes described herein. For example, a non-transitory computer-readable medium (e.g., memory 430) may store a set of instructions (e.g., one or more instructions or code) for execution by the processor 420. The processor 420 may execute the set of instructions to perform one or more operations or processes described herein. In some implementations, execution of the set of instructions, by one or more processors 420, causes the one or more processors 420 and/or the device 400 to perform one or more operations or processes described herein. In some implementations, hard-wired circuitry may be used instead of or in combination with the instructions to perform one or more operations or processes described herein. Additionally, or alternatively, the processor 420 may be configured to perform one or more operations or processes described herein. Thus, implementations described herein are not limited to any specific combination of hardware circuitry and software.

The number and arrangement of components shown in FIG. 4 are provided as an example. The device 400 may include additional components, fewer components, different components, or differently arranged components than those shown in FIG. 4. Additionally, or alternatively, a set of components (e.g., one or more components) of the device 400 may perform one or more functions described as being performed by another set of components of the device 400.

Figure 5:
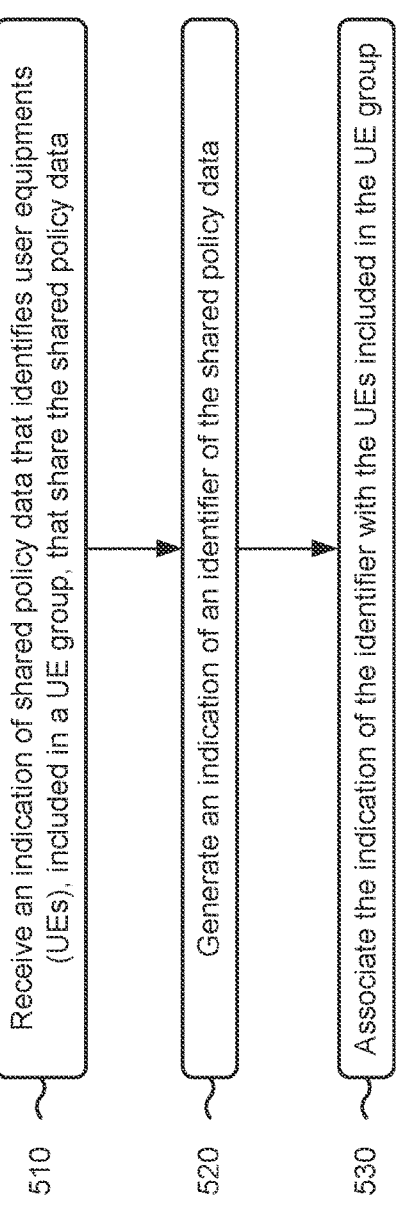
FIG. 5 is a flowchart of an example process associated with optimized propagation of shared policy data.

FIG. 5 is a flowchart of an example process 500 associated with optimized propagation of shared policy data. In some implementations, one or more process blocks of FIG. 5 may be performed by a data repository device (e.g., UDR device 105). In some implementations, one or more process blocks of FIG. 5 may be performed by another device or a group of devices separate from or including the data repository device, such as the network device 205. Additionally, or alternatively, one or more process blocks of FIG. 5 may be performed by one or more components of device 400, such as processor 420, memory 430, input component 440, output component 450, and/or communication component 460.

As shown in FIG. 5, process 500 may include receiving an indication of shared policy data (block 510). For example, the data repository device may receive an indication of shared policy data that identifies UEs, included in a UE group. As an example, the shared policy data may be shared by the UEs, included in the UE group, as described above. The shared policy data may be classified into one or more shared policy data types (e.g., at least one of shared AM policy data, shared SM policy data, or shared UE policy data).

As further shown in FIG. 5, process 500 may include generating an indication of an identifier of the shared policy data (block 520). For example, the data repository device may generate an indication of an identifier of the shared policy data, as described above.

As further shown in FIG. 5, process 500 may include associating the indication of the identifier with the UEs included in the UE group (block 530). For example, the data repository device may associate the indication of the identifier with the UEs included in the UE group, as described above. As an example, each UE, included in the UE group, may be associated with individual policy data, and the data repository device may add the indication of the identifier to the individual policy data for each UE included in the UE group.

In some implementations, process 500 includes transmitting, by the data repository device, the indication of the identifier to at least one of a unified data management (UDM) device, a policy control function (PCF), or a network exposure function (NEF).

In some implementations, process 500 includes receiving, by the data repository device, a request for individual policy data associated with a UE included in the UE group. As an example, the data repository device may obtain, based on the request, the individual policy data associated with the UE. For example, the data repository device may determine that the individual policy data associated with the UE includes the indication of the identifier. The data repository device may provide the individual policy data associated with the UE and the indication of the identifier (e.g., for the UE).

In some implementations, process 500 includes receiving, by the data repository device, a shared policy data request for shared policy data for a UE included in the UE group. As an example, the shared policy data request may include the identifier. For example, the data repository device may obtain, based on the identifier, the shared policy data and may provide the shared policy data (e.g., for the UE).

In some implementations, process 500 includes receiving, by the data repository device, a subscription request to subscribe to a shared policy data change notification service associated with the UEs included the UE group. The data repository device may create, based on the subscription request, a subscription to the shared policy data change notification service and may provide an indication of the subscription to the shared policy data change notification service (e.g., to a different network device).

In some implementations, process 500 includes receiving, by the data repository device, a subscription request associated with the shared policy data from at least one of a UDM device, PCF, or an NEF.

In some implementations, process 500 includes determining, by the data repository device and based on a subscription associated with the shared policy data, that the shared policy data is modified to modified shared policy data associated with the UEs included the UE group, and providing, by the data repository device to one or more network devices associated with the subscription, an indication of a data change notification. As an example, the indication of the data change notification may include an indication of the modified shared policy data associated with the UEs included in the UE group.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

Figure 6:
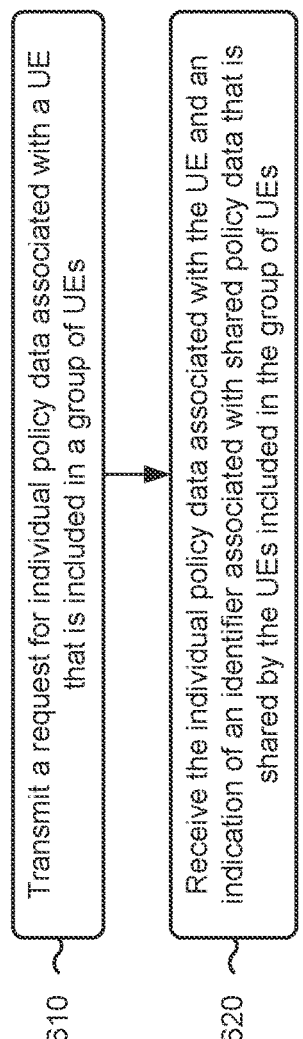
FIG. 6 is a flowchart of an example process associated with optimized propagation of shared policy data.

FIG. 6 is a flowchart of an example process 600 associated with optimized propagation of shared policy data. In some implementations, one or more process blocks of FIG. 6 may be performed by a network device (e.g., the network device 205). In some implementations, one or more process blocks of FIG. 6 may be performed by another device or a group of devices separate from or including the network device, such as the UDR device 105. Additionally, or alternatively, one or more process blocks of FIG. 6 may be performed by one or more components of device 400, such as processor 420, memory 430, input component 440, output component 450, and/or communication component 460.

As shown in FIG. 6, process 600 may include transmitting a request for individual policy data associated with a UE (block 610). For example, the network device may transmit a request for individual policy data associated with a UE, as described above. As an example, the UE may be included in a group of UEs that share the shared policy data.

As further shown in FIG. 6, process 600 may include receiving the individual policy data associated with the UE and an indication of an identifier associated with the shared policy data (block 620). For example, the network device may receive the individual policy data associated with the UE and an indication of an identifier associated with the shared policy data, as described above. As an example, the individual policy data and the indication of the identifier are retrieved from a single resource URI structure.

In some implementations, the individual policy data may be at least one of AM policy data, SM policy data, or UE policy data.

In some implementations, process 600 includes transmitting, to a data repository device (e.g., UDR device 105), a request for the shared policy data for the UE. As an example, the request may include the identifier and the identifier may enable the shared policy data to be retrieved. The network device may receive the shared policy data.

In some implementations, process 600 includes transmitting, to the data repository device, a subscription request to subscribe to a shared policy data change notification service. As an example, the network device may receive an indication of a subscription to the shared policy data change notification service. In some implementations, the network device may be one of a UDM device, a PCF, or an NEF.

In some implementations, process 600 includes receiving, from the data repository device, an indication of a data change notification. As an example, the indication of the data change notification may include an indication of modified shared policy data associated with the UEs in the group of UEs. For example, the network device may cause the one or more UEs in the group of UEs to implement the modified shared policy data.

Although FIG. 6 shows example blocks of process 600, in some implementations, process 600 may include additional blocks, fewer blocks, different blocks, or differently arranged blocks than those depicted in FIG. 6. Additionally, or alternatively, two or more of the blocks of process 600 may be performed in parallel.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

To the extent the aforementioned implementations collect, store, or employ personal information of individuals, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various encryption and anonymization techniques for particularly sensitive information.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiple of the same item.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

In the preceding specification, various example embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

What is claimed is:

1. A method, comprising:
receiving, by a first network device, an indication of shared policy data,
wherein the indication of shared policy data identifies user equipments (UEs), included in a UE group, that share the shared policy data;
generating, by the first network device, an indication of an identifier of the shared policy data;
associating, by the first network device, the indication of the identifier with the UEs included in the UE group;
determining, by the first network device, a change in the shared policy data for a UE, included in the UE group; and
transmitting, by the first network device, a shared policy data change notification to a second network device,
wherein the second network device is subscribed for shared policy data change notifications for the UE.

2. The method of claim 1, further comprising:
transmitting the indication of the identifier to at least one of:
a unified data management (UDM) device,
a policy control function (PCF), or
a network exposure function (NEF).

3. The method of claim 1, wherein each UE, included in the UE group, is associated with individual policy data, and
wherein associating, by the first network device, the indication of the identifier with the UEs, included in the UE group, comprises:
adding, by the first network device, the indication of the identifier to the individual policy data for each UE included in the UE group.

4. The method of claim 1, further comprising:
classifying the shared policy data into one or more shared policy data types, wherein the one or more shared policy data types includes at least one of:
shared access and mobility management (AM) policy data,
shared session management (SM) policy data, or
shared UE policy data.

5. The method of claim 1 further comprising:
receiving, by the first network device, a request for individual policy data associated with a UE included in the UE group;
obtaining, by the first network device and based on the request, the individual policy data associated with the UE;
determining, by the first network device, that the individual policy data associated with the UE includes the indication of the identifier; and
providing, by the first network device, the individual policy data associated with the UE and the indication of the identifier.

6. The method of claim 1, further comprising:
receiving, by the first network device, a shared policy data request for shared policy data for the UE,
wherein the shared policy data request includes the identifier;

obtaining, by the first network device and based on the identifier, the shared policy data; and providing, by the first network device, the shared policy data for the UE.

7. The method of claim 1, further comprising:

receiving, by the first network device, a subscription request to subscribe to a shared policy data change notification service;

wherein the shared policy data change notification service is associated with the UEs included in the UE group;

creating, by the network device and based on the subscription request, a subscription to the shared policy data change notification service; and providing an indication of the subscription to the shared policy data change notification service.

8. The method of claim 1, further comprising:

receiving, by the first network device, a subscription request associated with the shared policy data from at least one of:

a unified data management (UDM) device, a policy control function (PCF), or a network exposure function (NEF).

9. The method of claim 1, wherein the first network device is a unified data repository (UDR) device.

10. A network device, comprising:

one or more processors configured to:

transmit, to a unified data repository (UDR) device, a request for individual policy data associated with a user equipment (UE), wherein the UE is included in a group of UEs, and wherein shared policy data is shared by the UE included in the group of UEs;

receive the individual policy data associated with the UE and an indication of an identifier associated with the shared policy data; and receive, from the UDR device, an indication of modified shared policy data associated with the UE in the group of UEs; and transmit the indication to the group of UEs.

11. The network device of claim 10, wherein the individual policy data and the indication of the identifier are retrieved from a single resource uniform resource identifier (URI) structure.

12. The network device of claim 10, where the individual policy data is at least one of:

access and mobility (AM) policy data, session management (SM) policy data, or

UE policy data.

13. The network device of claim 10, wherein the one or more processors are further configured to:

transmit, to the unified data repository (UDR) device, a request for the shared policy data for the UE, wherein the request includes the identifier, and wherein the identifier enables the shared policy data to be retrieved; and receiving the shared policy data.

14. The network device of claim 10, wherein the one or more processors are further configured to:

transmit, to the UDR device, a subscription request to subscribe to a shared policy data change notification service; and receive an indication of a subscription to the shared policy data change notification service.

15. The network device of claim 10, wherein the network device is one of:

a unified data management (UDM) device, a policy control function (PCF), or a network exposure function (NEF).

16. The network device of claim 10, wherein the one or more processors are further configured to:

cause one or more UEs in the group of UEs to implement the modified shared policy data.

17. A non-transitory computer-readable medium storing a set of instructions, the set of instructions comprising:

one or more instructions that, when executed by one or more processors of a first network device, cause the first network device to:

receive an indication of shared policy data, wherein the indication of shared policy data identifies user equipments (UEs), included in a UE group, that share the shared policy data;

generate an indication of an identifier of the shared policy data;

associate the indication of the identifier with the UEs included in the UE group;

determine a change in the shared policy data for a UE, included in the UE group; and transmit a shared policy data change notification to a second network device, wherein the second network device is subscribed for shared policy data change notifications for the UE.

18. The non-transitory computer-readable medium of claim 17, wherein the one or more instructions, when executed by the one or more processors, further cause the first network device to:

receive a request for individual policy data associated with a UE included in the UE group;

obtain, based on the request, the individual policy data associated with the UE included in the UE group;

determine that the individual policy data associated with the UE includes the indication of the identifier; and provide the individual policy data associated with the UE and the indication of the identifier.

19. The non-transitory computer-readable medium of claim 17, wherein the one or more instructions, when executed by the one or more processors, further cause the first network device to:

receive a shared policy data request for shared policy data for a UE included in the UE group, wherein the shared policy data request includes the identifier;

obtain, based on the identifier, the shared policy data; and provide the shared policy data for the UE.

20. The non-transitory computer-readable medium of claim 17, wherein the first network device is a unified data repository (UDR) device.

* * * * *